2,896,915
METHOD OF DRILLING WELLS

Walter J. Weiss, Sugar Land, and Richard H. Graves and Wilbur L. Hall, Bellaire, Tex., assignors to The Texas Company, New York, N.Y., a corporation of Delaware No Drawing. Application April 12, 1957
Serial No. 652,369
4 Claims. (Cl. 255—1.8)

This invention relates to the drilling of wells through subsurface formations by means of well drilling tools. More particularly, this invention relates to a drilling operation, such as a rotary drilling operation, which involves circulation of a drilling fluid through the well bore and about the drilling bit. In a rotary drilling operation a drilling fluid is pumped down the drill stem to the drilling bit at the bottom of the bore hole. The stream of drilling fluid then passes through the drilling bit and moves upwardly through the annular space between the drill stem and the well bore wall carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water-base drilling fluids has been difficult due to the mud making characteristics or properties of heaving shales. These shales have a tendency to disintegrate by swelling or cracking upon contact with water with the result that the walls of the bore hole become unstable or incompetent and the heaving shale material making up the walls of the bore hole becomes unstable and sloughs into the bore hole. In some instances the sloughing or moving of this heaving shale material into the bore hole results in a stuck drill stem. In other instances the heaving shale material swells and sloughs or caves into the bore hole with a resulting enlargement of the bore hole and the formation of large subterranean cavities.

In addition to the above-indicated difficulties of maintaining a true bore hole when drilling through heaving shale material with a conventional water-base mud, the resulting finely dispersed heaving shale material taken up into the drilling fluid, because of the mud making properties of heaving shale, adversely affects the viscosity characteristics of the drilling fluid. Upon a continued accumulation of these finely divided heaving shale particles in the drilling fluid the viscosity of the drilling fluid increases with the result that the drilling fluid must be thinned by the addition of costly chemicals thereto or by dilution with water. If the drilling fluid is thinned by water dilution the addition of more weighting material such as barium sulfate (barytes), iron oxide, lead sulfide (galena) and the like is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH lime-base drilling fluid which contains lime together with quebracho, caustic soda, water and the conventional hydratable bentonitic type of drilling clay. High pH, lime-base drilling fluids, however, cannot be employed without considerable difficulty while drilling through the more seriously heaving shale formations. Additionally, a high pH, lime-base drilling fluid is sensitive to salt contamination, such as contamination by calcium chloride or calcium sulfate, which causes clay flocculation with a resulting increase in viscosity and water loss. Although in some instances the desirable viscosity, mud weight and water loss properties of a high pH, lime-base drilling mud can be maintained while drilling through a heaving shale formation by the addition of suitable additives, such as the addition of caustic soda and a quebracho and the like, the continued addition of these additives to the drilling fluid usually involves considerable expense.

In copending, coassigned patent application Serial No. 596,456, filed July 9, 1956, now U.S. 2,802,783, there is described an aqueous or water-base drilling fluid particularly suitable for drilling through heaving shale formations. The disclosures of this application are herein incorporated and made a part of this disclosure. The aforesaid identified patent application describes this drilling fluid as being characterized by a relatively high dissolved calcium or calcium ion content sufficient to effectively stabilize and control the mud making properties of heaving shale material or clays in contact with the drilling fluid described therein. The particular drilling fluid described therein is characterized by a relatively high dissolved calcium or calcium ion content sufficient to effectively stabilize and control the mud making properties of heaving shale material or clays in contact therewith. More particularly, the drilling fluid described therein is characterized as an aqueous drilling fluid comprising an alkaline aqueous phase (filtrate phase) which is saturated with respect to calcium hydroxide and which contains a water soluble calcium salt which has a solubility in said aqueous phase greater than that of calcium hydroxide dissolved therein in an amount sufficient to yield a calcium or calcium ion concentration in said aqueous phase of at least 200 parts per million by weight. This application discloses that any water soluble calcium salt may be employed in the preparation of such a drilling fluid provided the calcium salt is more soluble in water, e.g., as measured at room temperature of about 25° C., than calcium hydroxide $Ca(OH)_2$ and provided the calcium salt when added to water produces or generates the desired free calcium or calcium ion content therein. Satisfactory water soluble calcium salts which may be employed in the preparation of such drilling fluids include calcium chloride $CaCl_2$, calcium sulfate $CaSO_4$, calcium acetate $Ca(C_2H_3O_2)_2$, calcium formate $Ca(CHO_2)_2$, calcium nitrate $Ca(NO_3)_2$, calcium gluconate $$Ca(CH_2OH(CHOH)_4.COO)_2$$

Other water soluble calcium salts might also be employed.

As disclosed in the foregoing patent application the calcium hydroxide present in the aqueous phase of the particular aqueous drilling fluid described therein may be added directly to the drilling fluid as hydrated lime $Ca(OH)_2$ or may be generated in situ by the addition of calcium oxide CaO to the water present in the drilling fluid. The calcium hydroxide might also be generated in situ by metathetical reaction involving a water soluble calcium salt such as calcium chloride and a suitable water soluble alkali metal base such as sodium hydroxide, the various ingredients being added in an amount sufficient to at least generate the amount of calcium hydroxide required to saturate the aqueous phase of the drilling fluid.

It is an object of this invention to provide a drilling method employing the above-identified drilling fluids whereby optimum results might be obtained in a drilling operation.

Still another object of this invention is to provide an improved drilling method for drilling through heaving shale formations.

Yet another object of this invention is to provide an improved drilling fluid particularly suitable for drilling through heaving shale formations and the like.

How these and other objects are attained will become apparent in the light of the accompanying disclosure. In at least one embodiment of the practice of this invention at least one of the foregoing objects will be attained.

In accordance with this invention an improved drilling fluid particularly suitable for drilling through heaving shale formations is obtained by providing an aqueous drilling fluid comprising a hydratable clayey material dispersed in an alkaline aqueous filtrate phase which consists essentially of a saturated aqueous calcium hydroxide solution and an amount of calcium or calcium ion or a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6 and a numerical value of $M_f/P_f$ not greater than a numerical value selected from the group consisting of 3.0 and 5.0, said numerical value being not greater than 3.0 when said dissolved calcium or calcium salt dissolved in said aqueous phase is derived from or is an inorganic calcium salt and said numerical value being not greater than 5.0 when said dissolved calcium or calcium salt dissolved in said aqueous phase is derived from or is an organic calcium salt wherein $M_f$ is the number of ccs. of N/50 $H_2SO_4$ required to titrate 1 cc. of said aqueous phase to methyl orange end point and $P_f$ is the number of ccs. of N/50 $H_2SO_4$ required to titrate 1 cc. of said aqueous phase to phenolphthalein end point.

In a drilling operation it has been observed that an improved drilling operation is obtained and mud making during the drilling operation when penetrating certain shale formations is substantially reduced, as evidenced by a reduced amount of weighting material being required during the drilling operation to maintain a given mud weight, by maintaining the $M_f/P_f$ value of the above-identified mud with the ranges indicated. In the case wherein the calcium salt added or present in the aqueous filtrate phase of the drilling mud is an inorganic calcium salt, such as calcium chloride, the $M_f/P_f$ value should not be greater than 3.0, preferably 2.0 or less. On the other hand, when the aqueous filtrate phase of the drilling mud has added thereto or contains therein the equivalent of a water soluble organic calicum salt, such as calcium acetate, the numerical value of $M_f/P_f$ should be less than 5.0.

A typical unweighted drilling mud containing hydratable drilling clay and 1½ lbs. of calcium chloride per barrel of drilling fluid, 3 lbs. of calcium lignosulfonate (Kembreak, clay dispersing agent) per barrel of drilling fluid and 3 lbs. of lime per barrel of drilling fluid might exihibt the following properties:

| | |
|---|---|
| Mud weight | About 10 lbs. per gallon. |
| Mud viscosity | About 40 seconds API (1500/1 qt.). |
| Gel strength: | |
| 0 min. | 0. |
| 10 min. | About 5–10 grams. |
| $P_f$ | About 0.5. |
| $M_f$ | About 1.0. |
| $P_m$ | In the range 8–10. |
| Free lime content | In the range of 1.5–2.5 lbs. per barrel of drilling fluid. |
| Calcium ion content | About 400 p.p.m. as determined by the standard Versenate method described in API Code RP-29. |
| pH | Not greater than 12.6, in the range 11.2–12.5. |
| Water loss | About 8 ccs. after the addition of about 4 lbs. of starch per barrel drilling fluid. |

As indicated in the above-identified patent applications any suitable dispersing agent may be employed in the preparation of a drilling fluid in accordance with this invention provided it is compatible with its environment in the drilling mud, i.e., is not salted out and does not undergo a chemical or physical change which would render it unsuitable or useless as a dispersing agent and provided it exhibits sufficient dispersing power in the drilling mud to disperse the hydratable drilling clay material within the drilling mud. An especially satisfactory dispersant is a lignosulfonate such as an alkali metal or an alkaline earth metal lignosulfonate, especially lignosulfonates such as calcium lignosulfonate derived from soft woods by the Marathon-Howard process. Suitable dispersing agents are sodium lignosulfonates and calcium lignosulfonates. Commercially available calcium lignosulfonates such as Kembreak and Lignox are particularly satisfactory. Other suitable dispersing agents include yellow dextrin, a degradation product of starch, Q-Broxin, a ferro-chrome-containing lignosulfonate, Rayflo, a predominantly sodium salt of a polymeric polyphenol derivative apparently obtained as an extract of hemlock bark.

The drilling fluids in accordance with this invention may also include the usual drilling fluid additives such as water loss additives, e.g., Impermex or My-lo-gel, prehydrolyzed starch products, CMC, a carboxymethylcellulose, and the like. It has been observed that an oil-in-water emulsion drilling mud prepared in accordance with this invention exhibits low water loss properties as compared with an oil-free, water-base mud.

Drilling fluids of this invention are particularly valuable when it is desired to maintain a relatively high density drilling fluid while drilling through heaving shale formations. When using an ordinary aqueous drilling mud to drill heaving shale formations, and the like, the shale is converted into mud resulting in the accumulation of low density solids in the drilling fluid. This accumulation of mud solids in the drilling fluid requires that the drilling fluid often be diluted with water in order to maintain a satisfactory clay-water relationship.

With drilling fluids of this invention the necessity to maintain a high density drilling fluid by the continual adjustment of the clay-water relationship by the addition of water and weighting material to the drilling fluid is avoided, by maintaining the value $M_f/P_f$ of the drilling fluid in a range in accordance with the teachings of this invention. Further, by utilizing the teachings of this invention an improved drilling operation is obtainable.

The following is exemplary of the practice of this invention and indicates the advantage when employing an aqueous drilling fluid having an alkaline aqueous filtrate phase saturated with respect to calcium hydroxide and containing a calcium ion concentration greater than 200 parts per million by weight, for example in the range 300–1000 parts per million by weight, the pH of said filtrate phase being not greater than 12.6, preferably in the range 11.2–12.5, of maintaining the $M_f/P_f$ ratio of the drilling fluid at a value in accordance with the practice of this invention. In actual drilling operation wherein a conventional water base clay mud was converted to a shale control mud as described hereinabove by the addition thereto of calcium chloride, calcium lignosulfonate (Kembreak), lime and starch in the amounts 1½, 3, 3 and 4 lbs. per barrel of mud, respectively, it was observed during the drilling operation, which in this instance employed an inorganic water soluble calcium salt (calcium chloride), that when the $M_f/P_f$ ratio was permitted to reach a value greater than 3, although a certain amount of shale control was exhibited, the ability of the drilling fluid to avoid mud making when a heaving shale or normally mud making formation was encountered, was less than desirable. This was exhibited by the fact that when the $M_f/P_f$ ratio exceeded a value of 3 mud making occurred and required the addition of a very large excess of weighting agent over the amount theoretically required in order to maintain a given mud weight. The advantages of employing a drilling mud having a controlled $M_f/P_f$ ratio in accordance with this invention are indicated in accompanying Table I.

Table I

| Drilling Depth, feet | Mud Wt., #/gal. | Weight Agent Used | | $M_f/P_f$ |
|---|---|---|---|---|
| | | Theoretical Sacks Req'd (100 lbs.) | Actual Sacks (100 lbs.) | |
| 9,316–10,141 (8 days' drilling) | 13.1–15.7 | 2,718 | 2,908 | 1.4–2.0 |
| 10,141–10,262 (1 day drilling) | 15.7–16.0 | 320 | 425 | 1.6–1.8 |
| 10,262–11,164 (10 days' drilling) | 15.8–16.0 | 147 | 1,988 | 2–3 |
| 11,164–11,463 (3 days' drilling) | 15.8 | 129 | 1,035 | 2–3 |
| 11,463–11,831 (2 days' drilling) | 15.8–16.0 | 403 | 430 | 1.5–1.9 |

The test data set forth in Table I was obtained during a drilling operation wherein the shale formation was topped at a depth of 9,144 feet and the shale control mud employed during the operation was an aqueous hole mud broken over by the addition of calcium chloride, Kembreak, lime and hydrolyzed starch in the amounts (#/bbl. mud) 1, 3, 3 and 4 respectively.

With respect to a shale control drilling mud in accordance with the practice of this invention wherein a water soluble organic calcium salt such as calcium acetate is employed in the preparation thereof it has been observed that a drilling mud prepared by adding to an aqueous Louisiana hole mud calcium acetate, Kembreak and lime in the amounts 1, 3, 3 lbs. per barrel of mud the resulting drilling mud possessed the following properties:

$P_m$ ---------------------------------- 9.8
$P_f$ ---------------------------------- 1.3
$M_f$ ---------------------------------- 3.9
$M_f/P_f$ ------------------------------ 3.0
Calcium ion concentration -------------- 880

It was observed that the aqueous filtrate phase resulting from the above formulated mud was capable of hardening shale. On the other hand, a drilling mud prepared by the addition of calcium acetate, sodium hydroxide and Kembreak in the amounts 2.38, 1.08 and 4 lbs. per barrel of mud, respectively, and another drilling mud prepared by the addition of sodium acetate trihydrate, lime and Kembreak in the amounts 1.84, 1, 4 lbs. per barrel of mud, respectively, the muds having an $M_f/P_f$ value of 11.3 and 7.8, respectively, exhibited substantially no shale hardening properties but rather tended to disperse shale therein and therefore possessed mud making properties.

The data set forth in Table I hereinabove clearly indicates the advantages, as evidenced by a reduced requirement of weighting agent to maintain a given mud weight, of maintaining $M_f/P_f$ at a value in accordance with this invention. If the value of $M_f/P_f$ exceeds that preferred in the practice of this invention the $M_f/P_f$ can be adjusted by adding to the mud an amount of lime or calcium hydroxide or caustic soda sufficient to reduce $M_f/P_f$ to a suitable value, preferably less than 2.0. It is preferred to adjust $M_f/P_f$ to a suitable value by the use of an alkali metal hydroxide such as NaOH which by reaction with calcium ions in the filtrate phase generates calcium hydroxide in situ. It appears that in situ generated calcium hydroxide is more effective in altering and/or maintaining $M_f/P_f$ at a value in the desired range.

As will be apparent to those skilled in the art in the light of the foregoing disclosure many substitutions, alterations and changes are possible in the practice of this invention without departing from the spirit or scope thereof.

We claim:

1. In the drilling of a bore hole through a heaving shale formation wherein an aqueous drilling fluid is passed through the bore hole during the drilling operation and wherein the drilling fluid comprises a hydratable clayey material dispersed in an alkaline aqueous filtrate phase and a dispersing agent for said clayey material therein, said aqueous phase consisting essentially of a saturated aqueous calcium hydroxide solution and a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6 and wherein during the drilling operation the numerical value of $M_f/P_f$ of the drilling fluid tends to exceed 3.0 when said calcium salt dissolved in said aqueous phase is an inorganic calcium salt and 5.0 when said calcium salt dissolved in said aqueous phase is an organic calcium salt, $M_f$ being the number of ccs. of N/50 $H_2SO_4$ required to titrate 1 cc. of said aqueous phase to methyl orange end point and $P_f$ being the number of ccs. of N/50 $H_2SO_4$ required to titrate 1 cc. of said aqueous phase to phenolphthalein end point, the improvement which comprises maintaining said aqueous phase saturated with calcium hydroxide and adjusting the $M_f/P_f$ value of the drilling fluid when the value exceeds 3.0 to a value below 3.0 when said calcium salt is an inorganic salt and when the value exceeds 5.0 to a value below 5.0 when said calcium salt is an organic calcium salt by adding to said drilling fluid a suitable amount of an alkaline material selected from the group consisting of lime and an alkali metal hydroxide.

2. A method in accordance with claim 1 wherein said calcium ion concentration is in the range 300–1000 parts per million by weight.

3. A method in accordance with claim 1 wherein said calcium salt is an inorganic calcium salt selected from the group consisting of calcium chloride, calcium sulfate and calcium nitrate and wherein the numerical value of $M_f/P_f$ is adjusted to a value not greater than 2.0.

4. In the drilling of a bore hole through a heaving shale formation wherein an aqueous drilling fluid is passed through the bore hole during the drilling operation and wherein the drilling fluid comprises a hydratable clayey material dispersed in an alkaline aqueous filtrate phase and a dispersing agent for said clayey material therein, said aqueous phase consisting essentially of a saturated aqueous calcium hydroxide solution and a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6 and wherein during the drilling operation the numerical value of $M_f/P_f$ of the drilling fluid tends to exceed 3.0 when said calcium salt dissolved in said aqueous phase is an inorganic calcium salt and 5.0 when said calcium salt dissolved in said aqueous phase is an organic calcium salt, $M_f$ being the number of ccs. of N/50 $H_2SO_4$ required to titrate 1 cc. of said aqueous phase to methyl orange end point and $P_f$ being the number of ccs. of N/50 $H_2SO_4$ required to titrate 1 cc. of said aqueous phase to phenolphthalein end point, the improvement which comprises maintaining said aqueous phase saturated with calcium hydroxide and adjusting the $M_f/P_f$ value of the drilling fluid when the value exceeds 3.0 to a value below 3.0 when said calcium salt is an inorganic salt and when the value exceeds 5.0 to a value below 5.0 when said calcium salt is an organic calcium salt by adding to said drilling fluid a suitable amount of an alkali metal hydroxide.

References Cited in the file of this patent

UNITED STATES PATENTS 2,789,949    Scotty ---------------- Apr. 23, 1957
2,802,783    Weiss et al. ---------- Aug. 13, 1957